US012618865B2

(12) United States Patent
Srinivasan

(10) Patent No.: US 12,618,865 B2
(45) Date of Patent: May 5, 2026

(54) ROLLER BASED ACCELEROMETER

(71) Applicant: Tilak Srinivasan, Bangalore (IN)

(72) Inventor: Tilak Srinivasan, Bangalore (IN)

( * ) Notice: Subject to any disclaimer, the term of this patent is extended or adjusted under 35 U.S.C. 154(b) by 250 days.

(21) Appl. No.: 18/577,009

(22) PCT Filed: May 7, 2022

(86) PCT No.: PCT/IB2022/056211
§ 371 (c)(1),
(2) Date: Jan. 5, 2024

(87) PCT Pub. No.: WO2023/281394
PCT Pub. Date: Jan. 12, 2023

(65) Prior Publication Data
US 2025/0093379 A1      Mar. 20, 2025

(30) Foreign Application Priority Data

Jul. 5, 2021      (IN) .............................. 202141029021

(51) Int. Cl.
G01P 15/093 (2006.01)
G01F 15/00 (2006.01)
(52) U.S. Cl.
CPC .................................. G01F 15/003 (2013.01)
(58) Field of Classification Search
CPC .... G01P 15/003; G01P 15/093; G01P 15/105; G01P 15/125; G01P 2015/0817
USPC ........... 73/488, 499, 514.01, 514.02, 514.16, 73/514.21, 514.22, 514.26, 514.36, 73/514.37; 356/27, 28
See application file for complete search history.

(56) References Cited

U.S. PATENT DOCUMENTS

| | | | |
|---|---|---|---|
| 4,567,771 A | 2/1986 | Nelson et al. | |
| 5,360,956 A | 11/1994 | Shtanoki | |
| 9,417,260 B2 | 8/2016 | Bulatowicz | |

FOREIGN PATENT DOCUMENTS

| | | | | |
|---|---|---|---|---|
| CN | 2946107 | * | 12/2010 | |
| CN | 206231515 | * | 6/2017 | |
| CN | 109030866 A | * | 12/2018 | ........... G01P 15/093 |
| WO | 2021026605 A1 | | 2/2021 | |

* cited by examiner

*Primary Examiner* — Robert R Raevis

(57) ABSTRACT

A roller-based accelerometer (100) is disclosed and includes an enclosure (1). A hub (2) is defined at a center of the enclosure (1), concentric to an inner surface (1a) of the enclosure (1). A bearing (3) is rotatably housed in the hub (2). An arm (4) is fixedly connected to the bearing (3). The arm (4) is configured displace within the enclosure (1). A plurality of sensors (6) is mounted on the enclosure (1). A roller (5) is positioned at a free end of the arm (4), contacting the inner surface (1a) of the enclosure (1). The roller (5) traverses the inner surface of the enclosure and over the plurality of sensors (6). The arm (4) angularly oscillates when the accelerometer (100) is accelerated and is dependent on the position of the roller (5) over one of the plurality of sensors (6) to indicate the acceleration of the accelerometer (100).

8 Claims, 6 Drawing Sheets

100

ROLLER BASED ACCELEROMETER

TECHNICAL FIELD

Present disclosure generally relates to the field of Measurements and Metrology. Particularly, but not exclusively, the present disclosure discloses an accelerometer. Further, embodiments of the disclosure discloses a roller-based accelerometer to determine extent by which an object is accelerated.

BACKGROUND

Measurement is one of the fundamental processes performed to assess quantitative characteristics of a physical quantity. Measurement of quantities such as length, velocity, acceleration, displacement, elevation, inclination, etc., is performed to investigate certain physical conditions. For example, investigation of elevation, inclination, etc., is performed in geological studies. Determination of acceleration, velocity is of particular interest to engineers, physicists, space scientists, and so on. Measurement involves comparison of a physical quantity with a known standard, for example, length of an object is measured by placing the object next to a scale marked with divisions. Each division represents a standard like a millimeter, a centimeter, a meter, etc., and number of divisions matching exactly with the object gives the length measurement of the object. Determination of acceleration i.e., rate at which velocity of a moving object changes, is of particular interest in assessing certain vibrational characteristics of objects, such as machines, structures, vehicles, etc. Earlier mechanical systems were used for such determination, but with the advancement of sensor technology, sensors such as accelerometers of different types are used to determine accelerations.

Some of the extensive types of accelerometers used are piezoelectric based accelerometer constructed of a piezoelectric material. When piezoelectric accelerometer is coupled with an object whose vibration or acceleration is to be measured, the piezoelectric material in the accelerometer produces electric current in response to the force exerted by the vibrating object. The magnitude of electric current produced gives direct indication of acceleration of the vibrating object. Such accelerometers are expensive to manufacture and have complex configuration, thereby resulting in higher maintenance costs. Also, the accuracy of the piezoelectric accelerometers is completely dependent on the sensitivity of the piezoelectric material to pick up the force exerted by the vibrating object. Consequently, the piezoelectric accelerometers are often unable to pick-up weak signals of acceleration, and the piezoelectric material often detects or picks up signals when the object accelerates at higher speeds. Further, the existing accelerometers are prone to malfunction from external elements or disturbances such as dust, magnetic fields, electromagnetic fields etc., and are often suitable for operation only in controlled environments. Consequently, the ability to mount the existing accelerometers on an object to measure the acceleration of the object is often restricted severely.

The present disclosure discloses one such accelerometer which uses optical technology to determine acceleration of a moving object.

SUMMARY

One or more shortcomings of the conventional system or device are overcome, and additional advantages are provided through the provision of the method as claimed in the present disclosure.

Additional features and advantages are realized through the techniques of the present disclosure. Other embodiments and aspects of the disclosure are described in detail herein and are considered a part of the claimed disclosure.

In a non-limiting embodiment of the disclosure, a roller-based accelerometer is disclosed. The accelerometer includes an enclosure, a hub defined at a Centre of the enclosure and concentric to an inner surface of the enclosure. A bearing is rotatably housed in the hub. An arm is fixedly connected to the bearing where the arm is configured to displace within the enclosure. A plurality of sensors is mounted on the enclosure. A roller is positioned at a free end of the arm, contacting the inner surface of the enclosure where, the roller traverses the inner surface of the enclosure and over the plurality of sensors. The roller and the arm angularly oscillate when the accelerometer is accelerated and the position of the roller over one of the plurality of sensors is indicative of the acceleration of the accelerometer.

In an embodiment of the disclosure, the plurality of sensors is positioned to encompass half of a bottom region of the total circumference of the enclosure and the sensors are aligned for a total of 180 degrees along the outer surface of the enclosure.

In an embodiment of the disclosure, the plurality of sensors is aligned to extend for +90 degrees and −90 degrees from a bottom tip of the outer surface in the enclosure.

In an embodiment of the disclosure, a control unit is connected to the plurality of sensors.

In an embodiment of the disclosure, at least one light source positioned proximal to the enclosure for illuminating the sensors.

In an embodiment of the disclosure, the plurality of sensors are optical sensors that generate and transmit a signal to the control unit when no light is incident on the plurality of sensors.

In an embodiment of the disclosure, the roller is opaque and prevents light from being incident on the plurality of sensors.

In an embodiment of the disclosure, the enclosure, the hub, the bearing, and the arm are made of a transparent material for allowing the light to incident on the plurality of sensors.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF ACCOMPANYING DRAWINGS

The novel features and characteristics of the disclosure are set forth in the appended description. The disclosure itself, however, as well as a preferred mode of use, further objectives, and advantages thereof, will best be understood by reference to the following description of an illustrative embodiment when read in conjunction with the accompanying drawings. One or more embodiments are now described, by way of example only, with reference to the accompanying drawings wherein like reference numerals represent like elements and in which.

Figure 1:
FIG. 1 illustrates a perspective view of an enclosure in an accelerometer, in accordance with an embodiment of the present disclosure.
Figure 1:
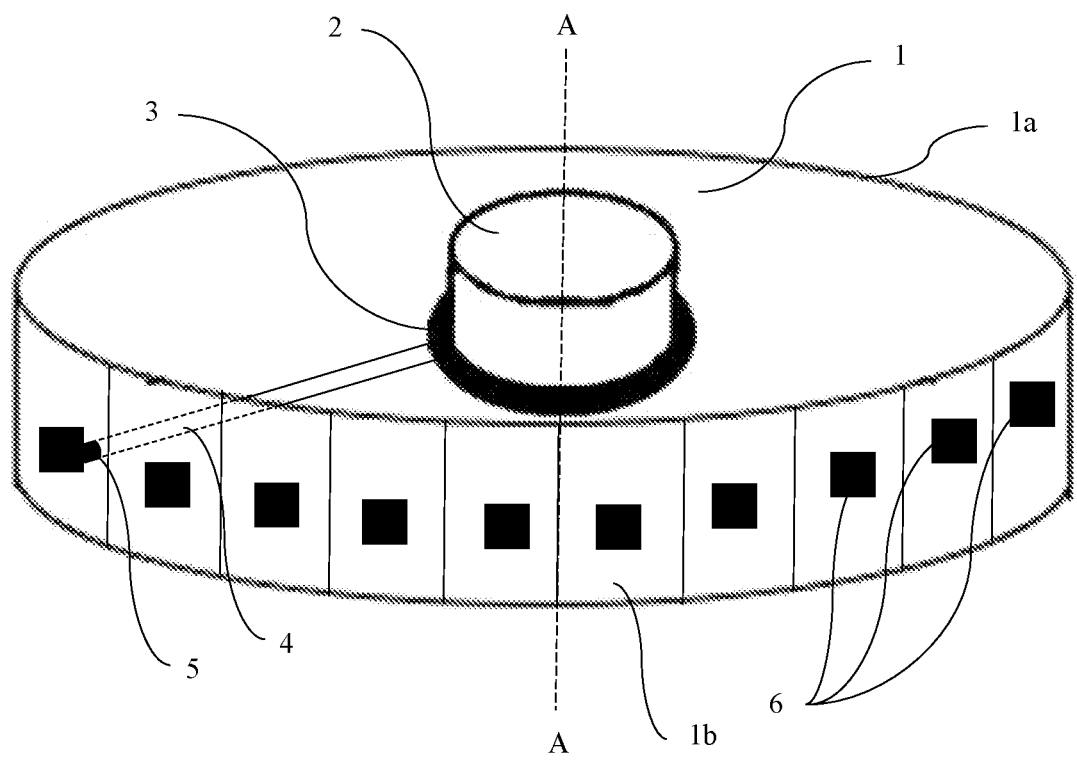

The figures depict embodiments of the disclosure for purposes of illustration only. One skilled in the art will readily recognize from the following description that alternative embodiments of the structured and methods illustrated herein may be employed without departing from the principles of the disclosure described herein.

DESCRIPTION

The foregoing has broadly outlined the features and technical advantages of the present disclosure in order that the description of the disclosure that follows may be better understood. Additional features and advantages of the disclosure will be described hereinafter which form the subject of the disclosure. It should be appreciated by those skilled in the art that the conception and specific embodiment disclosed may be readily utilized as a basis for modifying or designing other system for carrying out the same purposes of the present disclosure. It should also be realized by those skilled in the art that such equivalent constructions do not depart from the spirit and scope of the disclosure. The novel features which are believed to be characteristic of the disclosure, as to its organization, together with further objects and advantages will be better understood from the following description when considered in connection with the accompanying figures. It is to be expressly understood, however, that each of the figures is provided for the purpose of illustration and description only and is not intended as a definition of the limits of the present disclosure.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a system that comprises a list of components does not include only those components but may include other components not expressly listed or inherent to such mechanism. In other words, one or more elements in the device or mechanism proceeded by "comprises . . . a" does not, without more constraints, preclude the existence of other elements or additional elements in the mechanism.

The following paragraphs describe the present disclosure with reference to FIGS. 1 to 6. In the figures, the same element or elements which have same functions are indicated by the same reference signs. It is to be noted that, the accelerometer being mounted on an object is not depicted in the figured for the purpose of simplicity.

FIG. 1 illustrates a perspective view of an enclosure (1) in an accelerometer (100). The accelerometer (100) of the present disclosure includes the enclosure (1). The enclosure (1) is typically a hollow body for enclosing various components. The enclosure (1) may be made of glass, acrylic, plastic, or any other composite material which is transparent in nature for allowing passage of light. In an embodiment, the enclosure (1) is made of a lightweight polymer based composite material selected from a group of nanofibers including, but not limited to nylon nanofibers, polyacrylonitrile (PAN) and embedded into an epoxy matrix. In another embodiment, the enclosure (1) may be cylindrical or a disc shaped component with a pre-determined diameter. The disc shaped enclosure (1) may be defined with an internal surface (1*a*) and an external surface (1*b*). The enclosure (1) also is defined with an internal void portion or compartment to house the components of the roller-based accelerometer within the enclosure (1). Further the roller-based accelerometer [herein referred to as accelerometer] and their corresponding configuration are explained in detail below.

Figure 2:
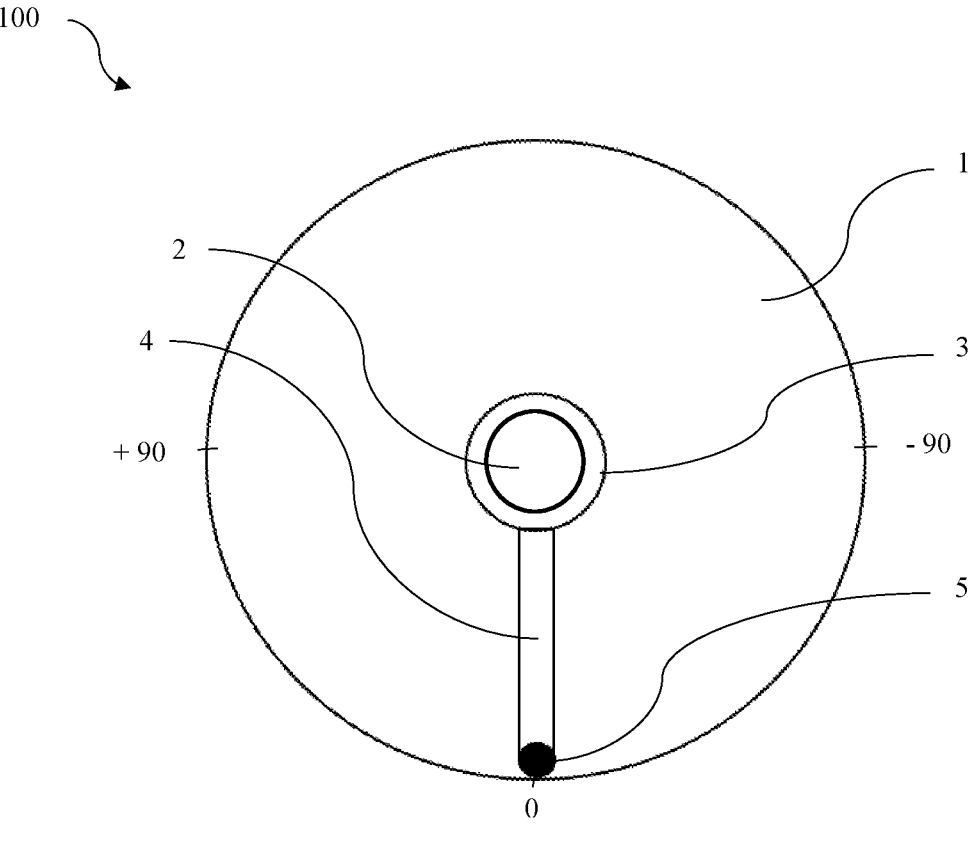
FIG. 2 illustrates a side view of the enclosure in the accelerometer, in accordance with an embodiment of the present disclosure.
Figure 3:
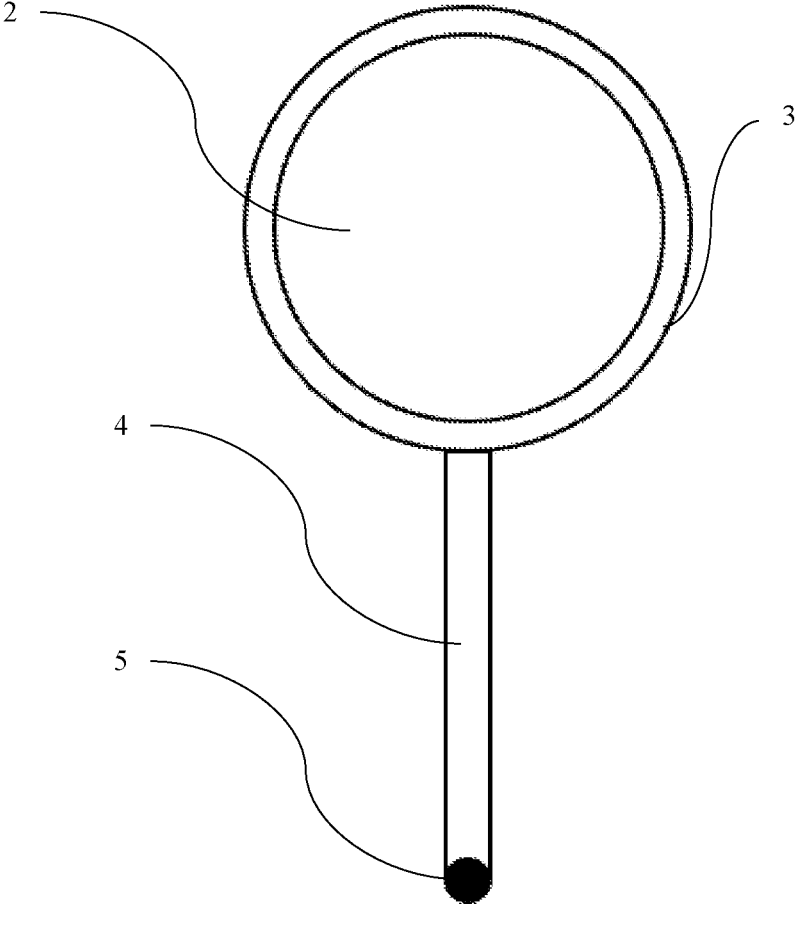
FIG. 3 illustrates a side view of a bearing connected to an arm, in accordance with an embodiment of the present disclosure.
Figure 4:
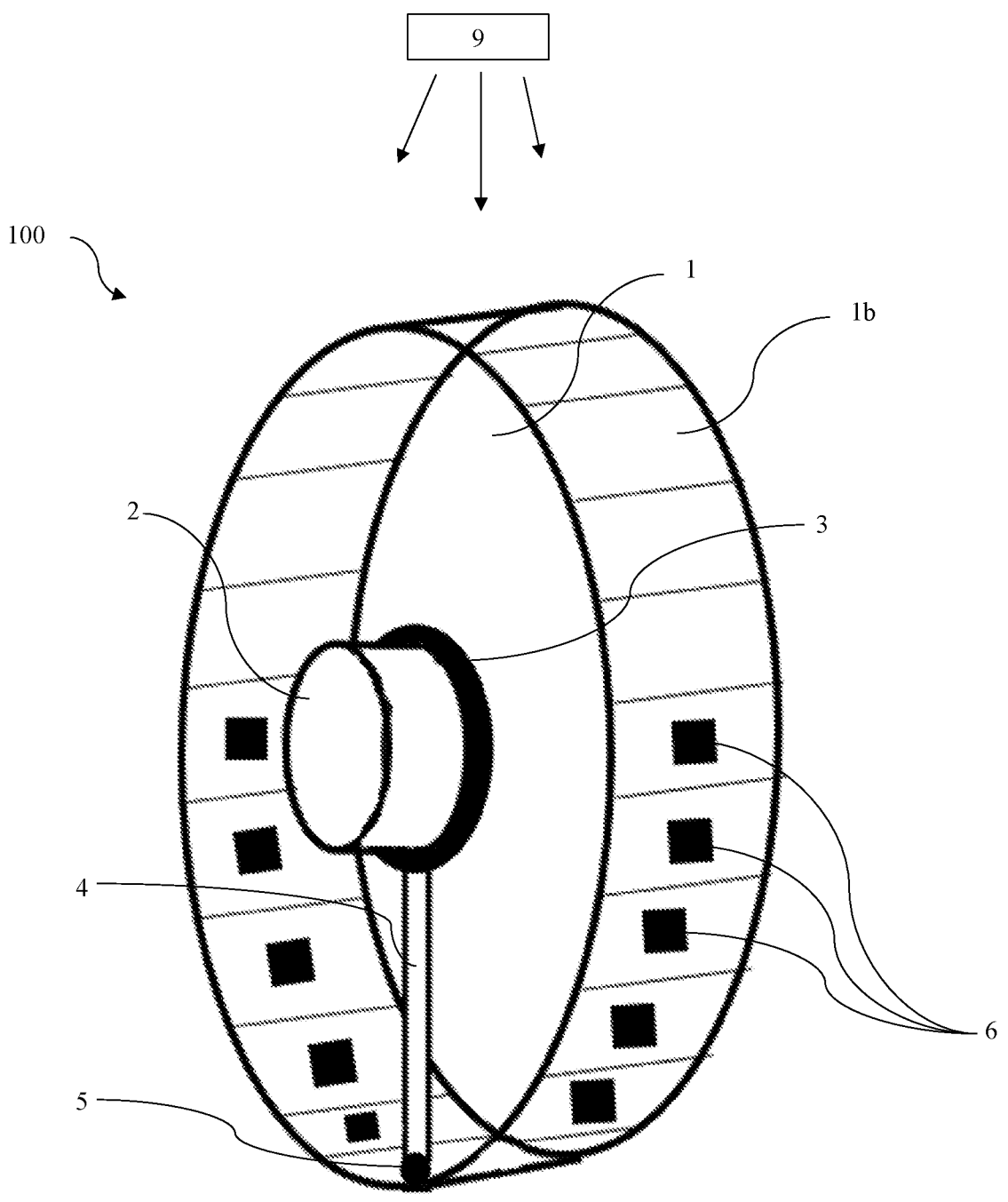
FIG. 4 illustrates a perspective view of a roller-based accelerometer, in accordance with an embodiment of the present disclosure.

FIG. 2 illustrates a side view of the enclosure of the accelerometer, and FIG. 3 illustrates a side view of a bearing (3) connected to an arm (4) of the accelerometer (100). FIG. 4 illustrates a perspective view of the accelerometer (100). The enclosure (1) may include a hub (2) defined at the center of the enclosure (1). The inner surface (1*a*) of the enclosure (1) and the hub (2) may be concentric in nature and the diameter of the hub (2) may be smaller than the diameter of the enclosure (1). The thickness of the hub (2) may be equivalent to that of the thickness of the enclosure (1). The hub (2) may be concentrically positioned within the enclosure (1) and the hub (2) may also be transparent in nature for allowing passage of light. The hub (2) may be a rigidly fixed member at the center of the enclosure (1) and may lie along a central axis (A-A) of the enclosure (1).

Further, the accelerometer (100) may also include a bearing (3) accommodated on the hub (2). The bearing (3) may also be concentrically aligned with the hub (2) in the enclosure (1) and the bearing (3) may be housed on the circumference of the hub (2). The bearing (3) may be configured to freely rotate with minimal friction on the hub (2). The bearing (3) may rotate about the central axis (A-A) of the enclosure (1) in only one direction at a time i.e., either X-direction of Y-direction. As an example, if the accelerometer is mounted on a moving object such as a vehicle, the acceleration values that may be determined based on the g forces that arise as a reaction to the acceleration of the object along the X axis which are calculated and determined in one direction at a given instance. As the moving object, accelerates in a straight line [X-direction], the bearing may rotate in a direction opposite to the displacement of the moving object [Y-direction]. The bearing (3) may also be transparent in nature for allowing the light to pass through such that the light continues to illuminate the surfaces where sensors are mounted and a constant output from the sensors (6) are obtained. In an embodiment, the bearing (3) may be ball bearings so as to form a ball and socket joint, or spherical roller bearings accommodated in the sockets, and may be selected from a group of acrylic bearings, Polyvinyl Chloride (PVC) bearings, synthetic material bearings and other bearing types. In an embodiment, when the arm (4) rotates inside the enclosure (1), the bearing (3) ensures smooth anti-frictional rolling for optimal and even minute determination of g-forces.

In an embodiment, movable components in the accelerometer (100) such as the bearing (1) connected to the hub (2), the arm (4) and the rollers (5) are made of material that offer very low co-efficient of friction. In an embodiment, the enclosure (1) is also made of material with low co-efficient of friction. In an embodiment, the enclosure (1), the hub (2), the bearing (3) and the arm (4) are made of transparent material and allow light to pass through. In an embodiment, all the components of the accelerometer (100) except the roller (5) in the accelerometer (100) are made of transparent material. In an embodiment, the hub (2), the bearing (3) the arm (4) and the roller (5) is made of light weight material. In an embodiment, all the components of the accelerometer (100) are made of light weight material. The enclosure (1) may further be configured with the arm (3) as indicated above. One end of the bearing (3) may come in contact with the hub (2) whereas, the other end of the bearing (3) may include the arm (4) arm (4) may be an elongated member that is attached to the bearing (3) [clearly seen from the FIG. 4]. The arm (4) may also be made of composite material which is lightweight, and the arm (4) may be transparent in nature for allowing the passage of light. The arm (4) may substantially extend from the bearing (3) proximal to the inner surface (1a) of the enclosure (1) with a roller (5) provided at a tip of the arm (4). The roller (5) may be configured to come in contact with the inner surface (1a) of the enclosure (1) as it is subjected to movement due to movement of the bearing (3). The roller (5) may slide with minimal friction on the inner surface (1a) of the enclosure (1). The bearing (3) may rotate about the central axis (A-A) of the enclosure (1) and the arm (4) attached with the bearing (3) may also be subjected to angular rotation along with the bearing (3). The roller (5) at the tip of the arm (4) may slide over the inner surface of the enclosure (1) as the bearing (3) rotates about the central axis (A-A) of the enclosure (1) and the roller (5) may maintain continuous contact with the inner surface (1a) of the enclosure (1). In an embodiment, the roller (5) may be painted to be opaque in nature such that no light passes through the roller (5). The roller (5) may be rendered opaque by processes including but not limited to painting, coating, plating, or any other deposition technique. In an embodiment, a lightweight solid block of roller (5) may also be employed which is opaque and does not allow passage of light through it. In an embodiment, the roller (5) is made of an opaque material and opaque nature of the roller (5) may prevent light from passing through. In an embodiment, an outer surface of the roller (5) may be coated with an opaque material that prevents the passage of light. In a preferable embodiment, the roller (5) may be a hollow component for reducing the overall weight of the roller (5).

The enclosure (1) may also be embedded with a plurality of sensors (6) [hereinafter referred to as the sensors]. The outer surface (1b) of the enclosure (1) may include the sensors (6) which may be spaced apart from each other in an equidistant manner. In an embodiment, the sensors (6) are optical sensors (6) which generate a signal when no light is incident on the plurality of sensors (6) [herein referred to as sensors]. The sensors (6) may be provided along one half, preferably lower half of the enclosure (1) such that the sensors (6) encompass half of the bottom region of the total circumference of the enclosure (1). The sensors (6) may be aligned for a total of 180 degrees along the outer surface (1b) of the enclosure (1). The sensors (6) may be aligned to extend for +90 degrees and −90 degrees from the bottom tip of the outer surface (1b) in the enclosure (1). Further, at least one light source (9) may be positioned proximal to the enclosure (1) or fixed to another half of the enclosure (1) opposite to the one half for illuminating the sensors (6). The light source (9) may be configured to emit light of a pre-determined wavelength constantly and continuously onto the enclosure (1). The at least one light source (9) is configured such that the light beams from the at least one light source (9) incidents on all the sensors (6) in the lower half of the enclosure (1). Based on this, a signal may be transmitted by the sensors (6) to a control unit when no light incidents on the sensors (6). The sensors (6) are placed such that during angular deflection of the arm (4), visibility of the sensor (6) or a group of sensors (6) is completely blocked/eclipsed by the opacity of the roller (5) at the tip of the arm (4), when viewed from the opposite side. For example, if the arm (4) is at extreme negative end i.e., −90 degrees, the sensor (6) or the group of sensors (6) will completely be blocked/eclipsed by the opaque roller (5) of the arm (4) when viewed from opposite side i.e., from behind the enclosure (1). The corresponding sensor (6) that is completely blocked/eclipsed by the roller (5) and does not receive light, transmits a signal to the control unit. The control unit consequently interprets the position of the roller (5) based on the signal received from the sensor (6) and hence the acceleration associated with that corresponding position is derived. The control unit may further indicate the determined acceleration on a display unit. The control unit may indicate the determined acceleration of the object, by the displacement of the arm (4) as a reaction to the acceleration of the object, in terms of g-forces. In an embodiment, the enclosure (1) as described above, may be divided into a first half region and a second half region. The first half region of the enclosure (1) may be the top half of the enclosure (1) and the second half region of the enclosure (1) may be the bottom half region of the enclosure (1). Further, the sensors (6) may be embedded on the second half region of the enclosure (1). In an embodiment, the sensors (6) may be positioned only in a lower left quadrant of the enclosure (1).

Figure 5:
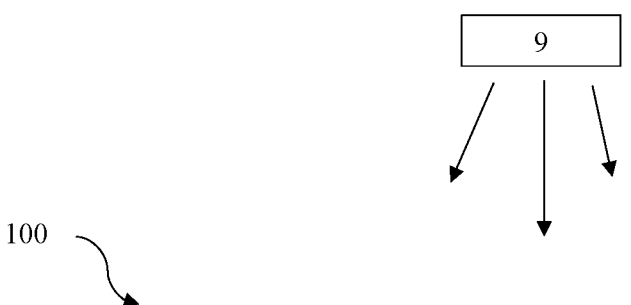
FIG. 5 illustrates another perspective view of the roller-based accelerometer of FIG. 4 mounted on a platform, in accordance with an embodiment of the present disclosure.
Figure 5:
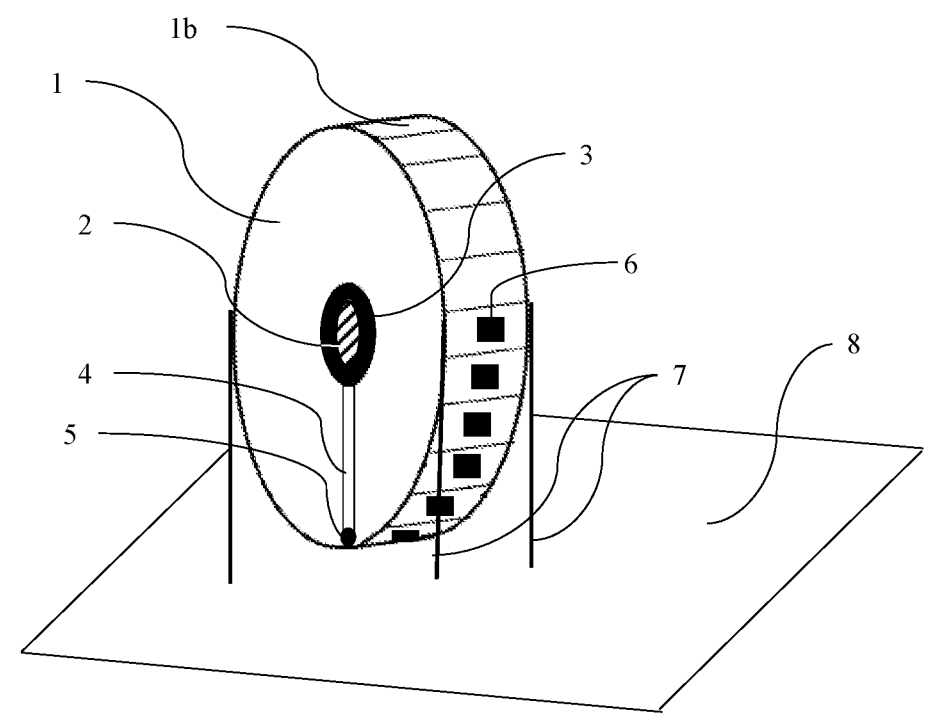
Figure 6:
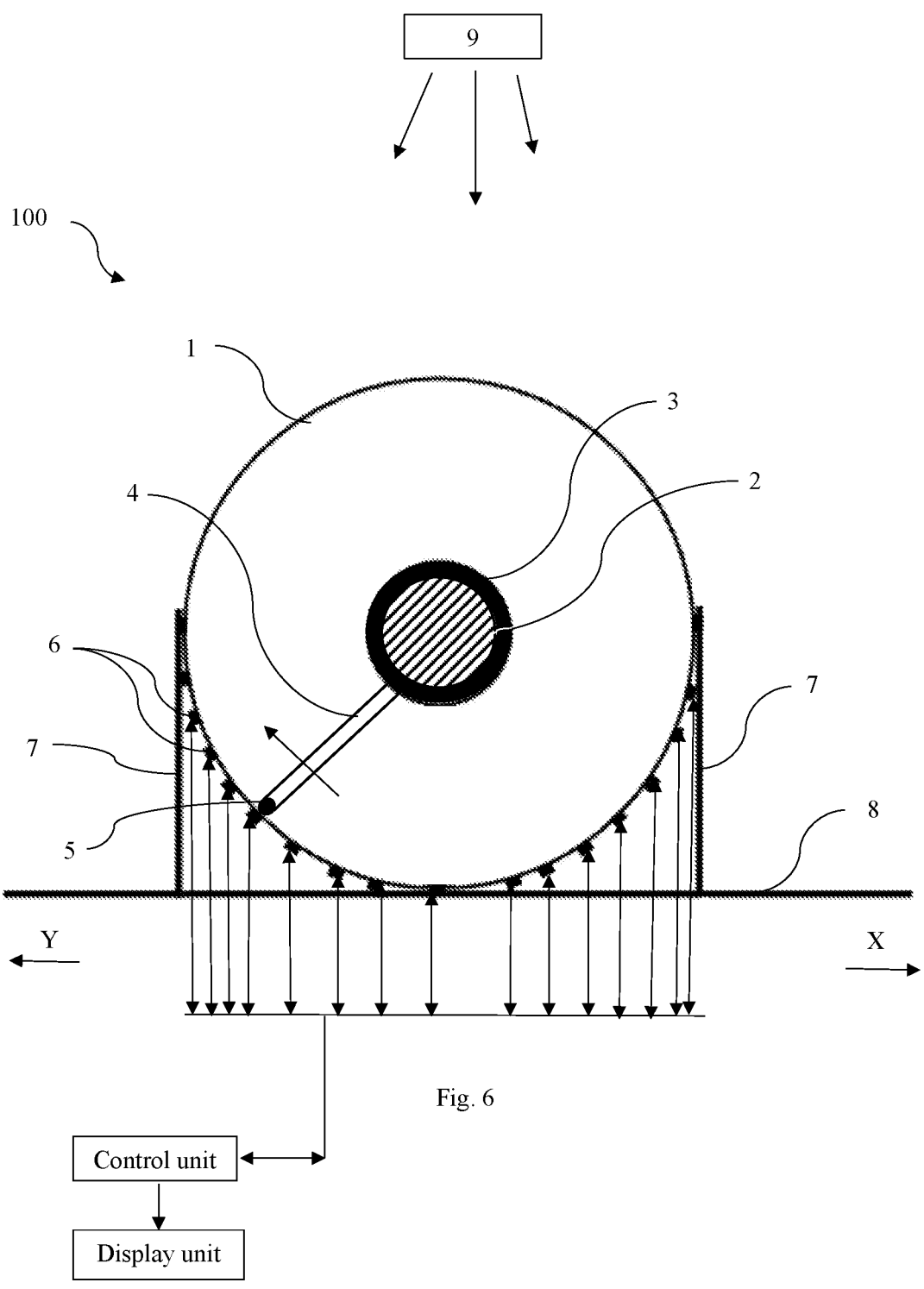
FIG. 6 illustrates a side view of the accelerometer mounted on the platform, in accordance with an embodiment of the present disclosure.

FIG. 5 and FIG. 6 illustrates a perspective view and a side view respectively, of the accelerometer (100) mounted on a platform (8). The accelerometer (100) may be mounted on a platform (8) by any known means including but not limited to a plurality of support members (7) or fixtures. The platform (8) itself may be placed on an object whose acceleration is to be measured. In an embodiment, the accelerometer (100) itself may be configured to be mounted directly onto the object whose acceleration is to be measured. In order to measure acceleration of any given object i.e., change in velocity with respect to time of the object, the object is placed in contact with the enclosure (1) of the accelerometer (100). The object may experience force 'F' in a given direction. The momentum i.e., product of mass and velocity of the object changes with respect to time which will be exactly equal to magnitude of applied force. Acceleration of the object in a direction result in angular deflection [referred also as angular displacement or angular oscillation throughout the specification] of the arm (4). The extent of angular oscillation of the arm (4) may be proportional to the magnitude of acceleration with which the object moves. Thus, the extent of angular deflection of the arm (4) may give direct measurement of acceleration of the object subjected to the force 'F'. In an embodiment, the arm (4) having the roller (4) may be used for measurements.

An exemplary operational embodiment in which arm (4) exhibits angular displacement when the object is accelerated is presented with reference to FIG. 6. The arm (4) may angularly displace from its original (mean or neutral) position to extreme positions. In this case, the accelerometer (100) along with the platform (8) may move in an X direction. Consequently, the angular displacement of the arm (4) takes place in the opposite direction. In an embodiment, the extreme positions are +90 degrees and −90 degrees, which may define the maximum angular displacement positions for the arm (4). In another embodiment, angular deflection towards positive side i.e., 0 to +90 degrees corresponds to one direction of acceleration of the subject (P), while angular deflection towards negative side i.e., 0 to −90 degrees corresponds to opposite direction of acceleration of the object. The angular deflection of +/−90 degrees is an exemplary range only and should not be construed as a limitation, as other angles of rotations, for example greater than 90 degrees may also be possible.

The results from the sensor (6) give an indication in the form of a signal generated by the light incident on the sensor (6) being blocked by the roller (5). Consequently, it becomes evident that the arm (4) has deflected exactly by −90 degrees, which is in proportion to acceleration of the object. Thus, displacement of arm (4) to a unique position gives a unique acceleration reading of the object in the display unit which along with the control unit is pre-programmed to display the acceleration corresponding to the displacement of the arm (4) and corresponding to the sensor (6) which is blocked by the roller (5). Accuracy of deflection may be increased by increasing the number of optical sensors (6) and decreasing the spacing between them. For example, positioning a number of miniaturized sensors (6) for every degree of angular position could be devised in order to extract precision and pinpoint accurate readings. In an embodiment, an array, or a panel of optical sensors (6) may be provided on one half region of the enclosure (1) to detect angular position of the arm (4). The accelerometer (100) of the present disclosure may be surrounded by at least one light source (9) that emits beams of light onto the sensors (6) in the enclosure (1). When the object is subjected to acceleration in X direction, the arm (4) may undergo rotational motion in the opposite direction. In an embodiment, when the object moves or is accelerated in the Y direction, the arm (4) tends to rotate in the opposite direction or towards the X direction. The light sources (9) are selected such that the light beams have same or larger diameter than that of the enclosure (1). Optical sensors (6) may be placed on the outer surface (1a) of the enclosure (1) as explained above. The light emitted by both light sources (9) passes through the enclosure (1), the hub (2), the bearing (3) and through the arm (4) to impinge on the sensors (6) provided on the outer surface (1b) of the enclosure (1). Deflection of the arm (4) to a predetermined position will cause the roller (5) and the arm (4) to traverse on the inner surface (1a) of the enclosure (1). The roller (5) and the arm (4) may travel along the inner surface (1a) and may block the light from impinging or falling on the particular sensor (6) corresponding to the angular position of the arm (4). The particular sensor (6) on which the roller (5) blocks the passage of light, may send out a signal to the control unit. The control unit may subsequently determine the position of the arm (4) and the acceleration associated with that position of the arm (4) based on the signal received from the corresponding sensor (6).

In an embodiment, the inner surface (1a) of the enclosure (1) may be lined or provided with a coil or wire instead of the sensors (6). The coil or the wire may also be provided along one half of the enclosure (1). The coil may be connected to a power source and power may be continuously transmitted through the wire lined along the inner surface (1a) of the enclosure (1). Further, the roller (5) at the tip of the arm (4) may be of a conductive material. A wire [not shown in figures] may be connected to the roller (5) through the arm (4), and out through the hub (2). The other end of the wire connected to the roller (5) may be connected to the power source.

As the object is subjected to acceleration, the arm (4) and the roller (5) may rotate or may be displaced angularly to a unique position on the electric coil, which in turn will reflect as a unique electrical signal. The corresponding electrical signal may be transmitted and received by the control unit. The control unit may detect the corresponding position of the roller (5) from the received electrical signal. The acceleration of the object may subsequently be calculated from the position of the roller (5) along the inner surface (1a) of the enclosure (1).

An advantage of the accelerometer (100) is improved sensitivity and accuracy due to presence of optical sensors (6). Even smallest accelerations can be measured by strategically placing a number of sensors (6) for a given angular range, thereby enhancing accuracy of measurements. The accelerometer (100) of the present disclosure is also simple, easy to construct, portable, cost effective and time efficient using which quick and reliable measurements can be made.

The accelerometer (100) uses fewer complex parts in order to achieve accurate results. This also translates to a much economical manufacturing cost of the accelerometer (100).

EQUIVALENTS

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding the description may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated in the description.

| Reference numerals: | |
| --- | --- |
| Description | Referral Numeral |
| Enclosure | 1 |
| Inner surface | 1a |
| Outer surface | 1b |
| Hub | 2 |
| Bearing | 3 |
| Arm | 4 |
| Roller | 5 |
| Sensors | 6 |
| Support members | 7 |
| Platform | 8 |
| Light source | 9 |
| Accelerometer | 100 |

I claim:

1. A roller-based accelerometer (100) comprising:
an enclosure (1);
a hub (2) defined at a centre of the enclosure (1) and concentric to an inner surface (1a) of the enclosure (1);
a bearing (3) rotatably housed in the hub (2);
an arm (4) fixedly connected to the bearing (3) wherein the arm (4) is configured to displace within the enclosure (1);
a plurality of sensors (6) mounted on the enclosure (1);
a roller (5) positioned at a free end of the arm (4), contacting the inner surface (1a) of the enclosure (1) wherein, the roller (5) traverses the inner surface of the enclosure and over the plurality of sensors (6); and
wherein, the roller (5) and the arm (4) angularly oscillates when the accelerometer (100) is accelerated and, the position of the roller (5) over one of the plurality of sensors (6) is indicative of the acceleration of the accelerometer (100).

2. The accelerometer (100) as claimed in claim 1 wherein, the plurality of sensors (6) is positioned to encompass half of a bottom region of the total circumference of the enclosure (1) and the sensors (6) are aligned for a total of 180 degrees along the outer surface (1b) of the enclosure (1).

3. The accelerometer (100) as claimed in claim 1 wherein, the plurality of sensors (6) are aligned to extend for +90 degrees and −90 degrees from a bottom tip of the outer surface (1b) in the enclosure (1).

4. The accelerometer (100) as claimed in claim 1 comprising, a control unit connected to the plurality of sensors (6).

5. The accelerometer (100) as claimed in claim 1 comprises, at least one light source positioned proximal to the enclosure (1) for illuminating the sensors (6).

6. The accelerometer (100) as claimed in claim 1 wherein, the plurality of sensors (6) are optical sensors (6) that generate and transmit a signal to the control unit when no light is incident on the plurality of sensors (6).

7. The accelerometer (100) as claimed in claim 1 wherein, the roller (5) is opaque and prevents light from being incident on the plurality of sensors (6).

8. The accelerometer (100) as claimed in claim 1 wherein, the enclosure (1), the hub (2), the bearing (3), and the arm (4) are made of a transparent material for allowing the light to incident on the plurality of sensors (6).

* * * * *